C. B. WHITTEMORE.
Bundling Kindling-wood.
No. 142,309. Patented August 26, 1873.
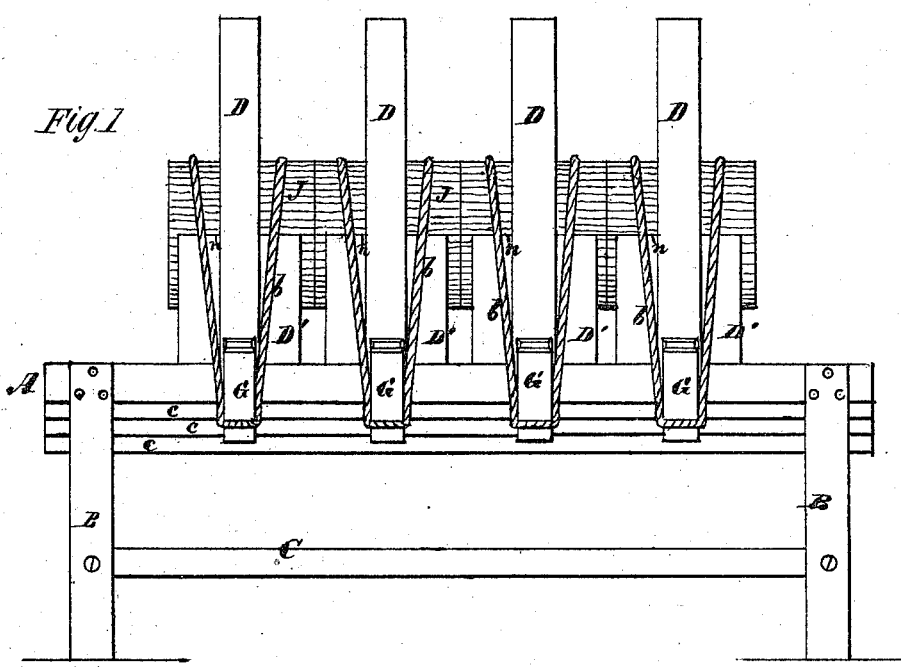
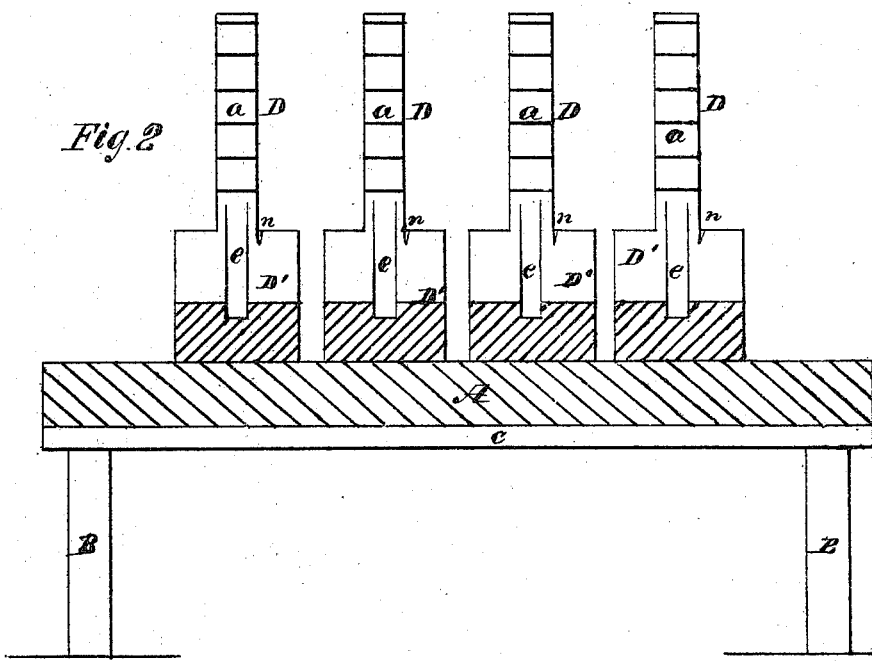
Witnesses:
Inventor C. B. WHITTEMORE.
Bundling Kindling-wood.
No. 142,309.
2 Sheets--Sheet 2
Patented August 26, 1873.
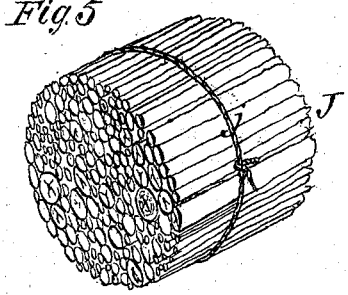
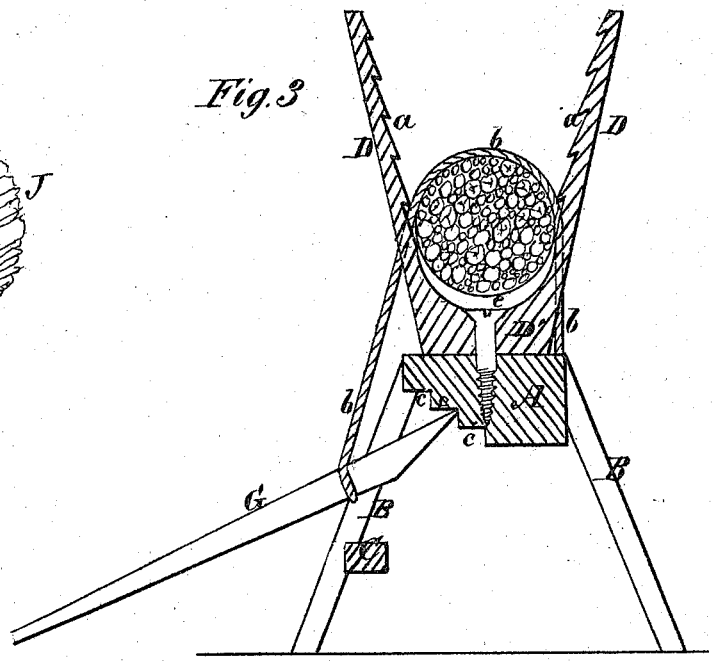
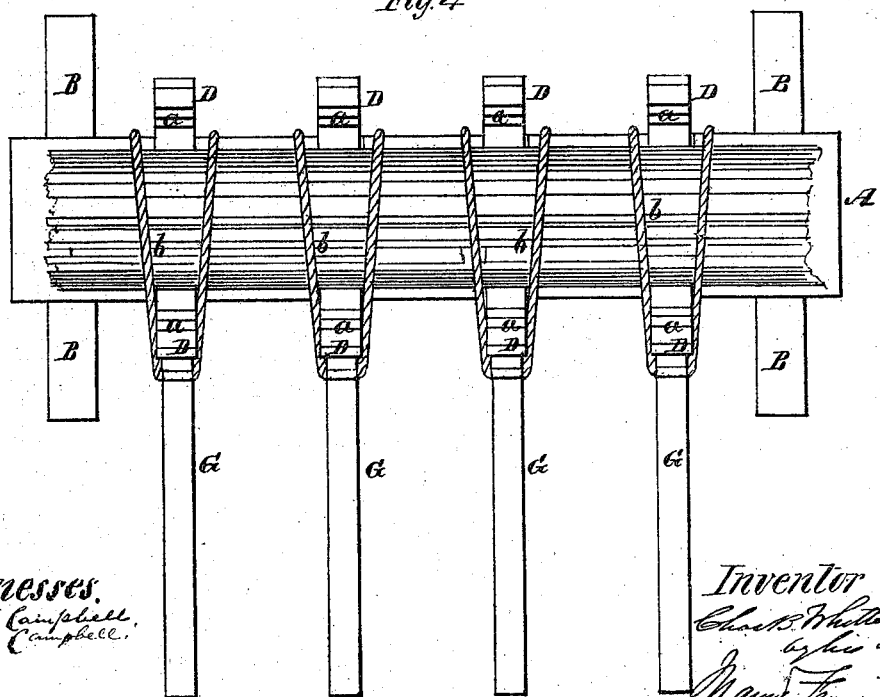

UNITED STATES PATENT OFFICE.

CHARLES B. WHITTEMORE, OF ARLINGTON, MASSACHUSETTS.

IMPROVEMENT IN BUNDLING KINDLING-WOOD.

Specification forming part of Letters Patent No. 142,309, dated August 26, 1873; application filed June 2, 1873.

*To all whom it may concern:*

Be it known that I, CHARLES B. WHITTEMORE, of Arlington, in the county of Middlesex and State of Massachusetts, have invented a new and Improved Method of Bundling Kindling-Wood; and I do hereby declare that the following is a full, clear, and exact description thereof, reference being had to the accompanying drawings making part of this specification, in which—

Figure 1, Plate 1, is an elevation of one side of a machine for bundling brush-wood. Fig. 2, Plate 1, is a section taken longitudinally and centrally through the machine. Fig. 3, Plate 2, is a section taken vertically and transversely through the machine, showing a bundle of brush-wood under compression and ready to be bound. Fig. 4, Plate 2, is a top view of the machine, showing a bundle of brush-wood under compression ready to be bound and sawed into bundles. Fig. 5, Plate 2, is a perspective view of a bundle of brush-wood as I prepare it.

My object is to utilize brush-wood or fagots for kindling fires by compressing the fagots into compact bundles, and sawing the same into proper lengths for use, as will be hereinafter explained.

The following description of my invention will enable others skilled in the art to understand it.

In the accompanying drawings, A represents a bench, which may be of any desired length, and which may be supported upon legs B, as shown in the drawings, or it may be mounted on wheels, so that it can be conveniently moved from one place to another. On top of the bench A I secure a number of forks, which are shaped somewhat like the capital letter U. Each fork consists of two narrow arms, D D, which have their inner surfaces serrated at *a*, and a broad semicircular base, D', which is nearly as wide as the length of the finished bundles. Into the concave surface of the broad portion D' a groove, *e*, is made, which extends from the root of the other arm, as shown in Figs. 2 and 3. These forks are rigidly secured to the bench A, a narrow space being left between them for the entrance of a saw. The bottom of the bench is stepped, as shown at *c*, which steps afford different fulcrums for the short arms of levers G. Each fork is provided with a lever, G, and each lever is attached to the back part of the bench A by means of strong ropes *b*, which ropes, when in use, are drawn over a bundle on opposite sides of the arms D of the forks, as shown in Figs. 1, 3, and 4.

The ropes or strings for binding the bundles are adjusted into the grooves *e*, and their ends drawn into and held by V-shaped notches *n*, which are made in the upper edges of the broad semicircular portions D'. A quantity of brush-wood, sufficient to make the bundles, is then laid evenly in the forks and forcibly compressed therein into a long bundle or roll. This compression is readily effected by means of the levers G and ropes *b*, and while the roll is by these means held under compression it is tied at each fork, and then sawed up into proper lengths, as indicated in Figs. 1 and 5.

By these means I am enabled to put up brush-wood into compact, portable, and merchantable bundles, and when thus put up the wood will quickly season and serve excellently well for kindling and other purposes.

If desired, dogs or catches of any suitable kind may be applied to a bar, C, which extends across horizontally between the front legs B B, for the purpose of holding the levers down and keeping the roll of brush-wood under compression while tying it, and sawing it into short bundles.

Having described my invention, what I claim as new, and desire to secure by Letters Patent, is—

The forks D D', applied upon a bench, A, and having combined with them compressing devices G *b* for compressing brush-wood preparatory to tying it and sawing it into bundles, substantially as described.

CHARLES BARTON WHITTEMORE.

Witnesses:
REBECCA WHITTEMORE,
REBECCA ADAMS.